US012719362B2

(12) United States Patent
Patel et al.

(10) Patent No.: US 12,719,362 B2
(45) Date of Patent: Aug. 25, 2026

(54) TUNABLE INTEGRATED VOLTAGE REGULATOR

(71) Applicant: Applied Materials, Inc., Santa Clara, CA (US)

(72) Inventors: Meghna Maheshkumar Patel, Navsari (IN); Mudit Sunilkumar Khasgiwala, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1174 days.

(21) Appl. No.: 17/669,702

(22) Filed: Feb. 11, 2022

(65) Prior Publication Data

US 2023/0261570 A1 Aug. 17, 2023

(51) Int. Cl.

*H02M 3/156* (2006.01)
*H01F 29/00* (2006.01)
*H02M 1/00* (2006.01)
*H02M 3/00* (2006.01)

(52) U.S. Cl.

CPC ............ *H02M 3/156* (2013.01); *H01F 29/00* (2013.01); *H02M 1/0064* (2021.05); *H02M 3/003* (2021.05)

(58) Field of Classification Search

CPC .... H02M 3/156; H02M 3/155; H02M 3/1552; H02M 3/1555; H02M 3/1557; H02M 3/1566; H02M 3/157; H02M 3/158; H02M 3/1582; H02M 3/003; H02M 1/0064; H02M 1/0067; H02M 1/007; H02M 1/0048; H02M 1/0058; H01F 29/00; H01F 29/02;

(Continued)

(56) References Cited

U.S. PATENT DOCUMENTS 10,788,523 B1 * 9/2020 Michal ................ H02M 3/1582
2007/0182520 A1 * 8/2007 Kawakubo .............. H02N 2/10 336/200
2012/0293972 A1 11/2012 Pan et al.

(Continued)

FOREIGN PATENT DOCUMENTS

CN 109643954 A 4/2019
CN 111313690 A 6/2020

(Continued)

OTHER PUBLICATIONS

Application No. PCT/US2023/012731 , International Search Report and Written Opinion, Mailed On Jun. 1, 2023, 10 pages.

(Continued)

*Primary Examiner* — Nguyen Tran

(74) *Attorney, Agent, or Firm* — Kilpatrick Townsend & Stockton LLP

(57) ABSTRACT

An integrated voltage regulator (IVR) for on-chip integrated circuit applications may include a tunable inductor that may be adjusted to generate a target output for the IVR. The tunable inductor may include a piezoelectric material that may cause the relative permeability of the inductor to change based on an applied stimulus voltage. A control circuit may receive a target value, such as a target output voltage, and retrieve or calculate a target inductance value or voltage to be applied to the inductor to generate the target output value. A feedback circuit may monitor the output value and adjust the switching frequency or voltage applied to the inductor during operation in order to adjust the output value.

20 Claims, 8 Drawing Sheets

(58) Field of Classification Search
CPC ........ H01F 29/025; H01F 29/04; H01F 29/06; H01F 29/08
See application file for complete search history.

(56) References Cited

U.S. PATENT DOCUMENTS

| | | | | |
|---|---|---|---|---|
| 2014/0253272 | A1 | 9/2014 | Sun | |
| 2016/0012967 | A1 | 1/2016 | Kurs et al. | |
| 2018/0075966 | A1 | 3/2018 | Sun | |
| 2018/0234024 | A1 | 8/2018 | Bhat et al. | |
| 2018/0342343 | A1* | 11/2018 | Viala | H01F 10/3218 |
| 2018/0374623 | A1* | 12/2018 | Ito | H01F 27/2804 |
| 2019/0393785 | A1* | 12/2019 | Pao | H02M 1/08 |
| 2020/0402934 | A1 | 12/2020 | Kim et al. | |

FOREIGN PATENT DOCUMENTS

| | | | |
|---|---|---|---|
| JP | 6213268 | B2 | 10/2017 |
| TW | 201714392 | A | 4/2017 |
| TW | 201911721 | A | 3/2019 |

OTHER PUBLICATIONS

Ahsanuzzaman et al., Low-Volume Buck Converter with Adaptive Inductor Core Biasing, Applied Power Electronics Conference and Exposition (APEC), Feb. 5, 2012, pp. 335-339.

Alonso et al., Optimizing Universal Ballasts Using Magnetic Regulators and Digital Control, Institute of Electrical and Electronics Engineers Transactions on Industrial Electronics, vol. 58, No. 7, Jul. 1, 2011, pp. 2860-2871.

European Application No. 23753449.0, Extended European Search Report mailed on Dec. 23, 2025, 9 pages.

* cited by examiner

206
Vctrl
210
t
302-2
302-1
312
312
D
E
P
204
304

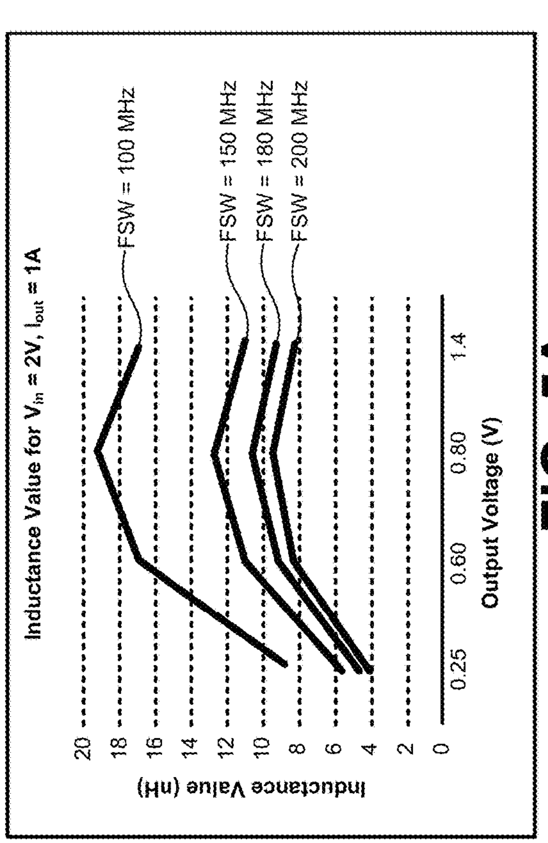
FIG. 5A
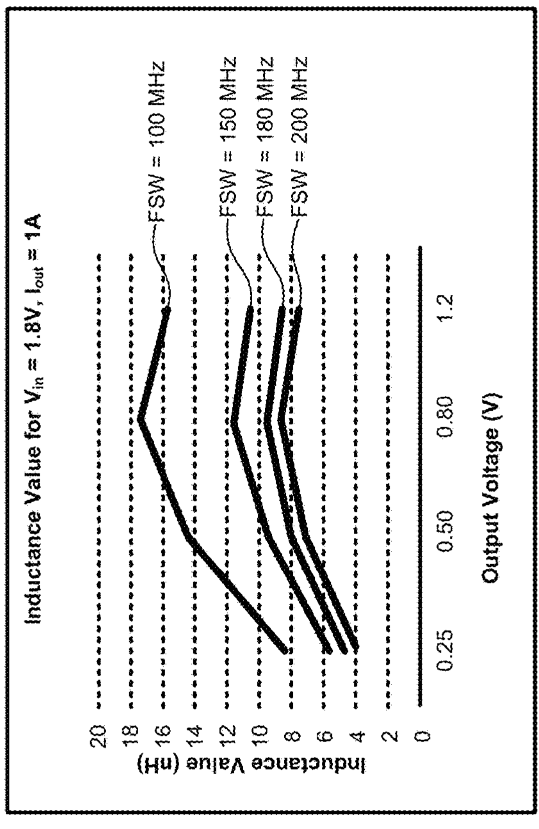
FIG. 5B
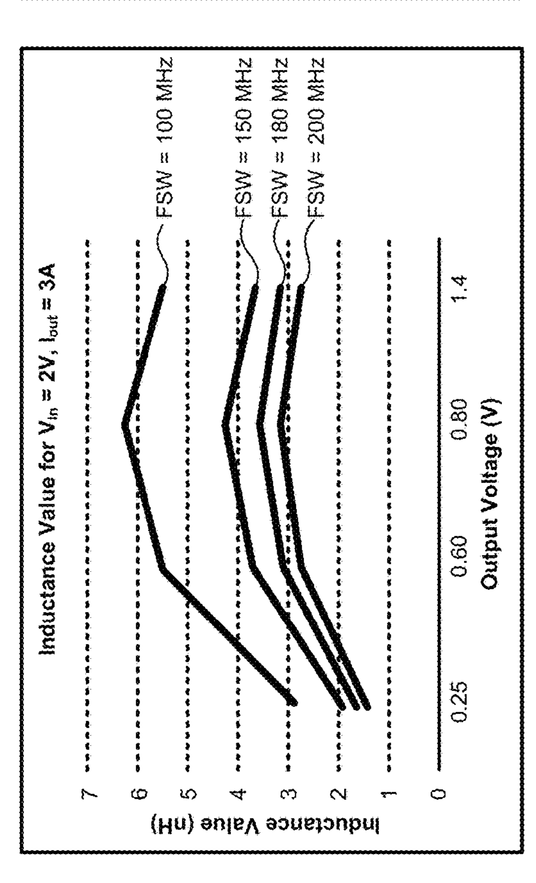
FIG. 5C
Inductance Value for $V_{in}$ = 1.8V, $I_{out}$ = 3A
Inductance Value (nH)
7 6 5 4 3 2 1 0
0.25 0.50 0.80 1.2
Output Voltage (V)
FSW = 100 MHz
FSW = 150 MHz
FSW = 180 MHz
FSW = 200 MHz
FIG. 5D

TUNABLE INTEGRATED VOLTAGE REGULATOR

TECHNICAL FIELD

This disclosure generally relates to an tunable integrated voltage regulator. More specifically, this disclosure describes a voltage regulator that may tune an output characteristic by adjusting and operating parameter, such as an inductor value, during operation.

BACKGROUND

In modern integrated circuits, power density is increasing with every new process node. These systems typically require low voltages, high current, and high power density for the optimal performance of digital circuits. Complicating matters further, process nodes may also need to exhibit a fast response using a very small footprint. In order to meet these requirements, many process nodes include an integrated power supply to provide chip-level power management and greater power efficiency for the system. Specifically, some modern nodes include integrated voltage regulators (IVRs) that are implemented as low-dropout regulators or switching buck converters. When considering these two types of power supplies, a switching regulator may be more efficient than a low-dropout regulator in terms of power consumption. The key to power efficiency in a switching regulator lies in the design of the inductor, which may require a relatively high inductance density while maintaining a precise inductance valve. Therefore, improvements in switching regulators are needed in the art.

SUMMARY

In some embodiments, a tunable integrated voltage regulator may include a tunable inductor, a switch coupled to the tunable inductor, and a control circuit configured to tune an inductance value of the tunable inductor to generate an target output value of the integrated voltage regulator.

In some embodiments, a method of tuning an integrated voltage regulator to produce a target output value may include receiving the target output value for the integrated voltage regulator; determining a stimulus to be applied to an inductor of the integrated voltage regulator that corresponds to the target output value; applying the stimulus to the inductor to change an inductance of the inductor to a target inductance; and operating the integrated voltage regulator with the target inductance to produce the target output value.

In some embodiments, a control circuit for tuning an integrated voltage regulator to produce a target output value may include one or more processors and one or more memory devices storing instructions that, when executed by the one or more processors, cause the one or more processors to perform operations including receiving the target output value for the integrated voltage regulator; determining a stimulus to be applied to an inductor of the integrated voltage regulator that corresponds to the target output value; causing the stimulus to be applied to the inductor to change an inductance of the inductor to a target inductance; and causing the integrated voltage regulator to be operated with the target inductance to produce the target output value.

In any embodiments, any and all of the following features may be implemented in any combination and without limitation. The tunable integrated voltage regulator may include a buck regulator with a capacitor in series with the tunable inductor. The tunable inductor may include a piezoelectric material with a first side and a second side; and the control circuit may be configured to tune the inductance value of the tunable inductor by applying a voltage between the first side and the second side of the piezoelectric material. The piezoelectric material may include a piezoelectric coefficient between approximately −190 pC/N and approximately −640 pC/N. The piezoelectric material may be positioned between a first magnetic layer and a second magnetic layer. The IVR may also include a conductive coil wrapped around the piezoelectric material to form a solenoid-type inductor; and a pair of electrical leads coupled to opposite edges of the piezoelectric material and coupled to the control circuit, where the pair of electrical leads may be different from the conductive coil. Tuning the inductance value of the tunable inductor may include deforming a piezoelectric layer of the tunable inductor; deforming one or more magnetic layers caused by deforming the piezoelectric layer; changing an effective magnetic anisotropy field of the one or more magnetic layers by deforming the one or more magnetic layers; changing a relative permeability of the one or more magnetic layers by changing the effective magnetic anisotropy field of the one or more magnetic layers; and changing the inductance value of the tunable inductor by changing the relative permeability of the one or more magnetic layers. The method/operations may also include monitoring an output value of the integrated voltage regulator during operation; determining that the output value of the integrated voltage regulator is not within a threshold range of the target output value; and adjusting an operating parameter of the integrated voltage regulator to move the output value of the integrated voltage regulator closer to the target output value. Adjusting the operating parameter of the integrated voltage regulator may include adjusting a switching frequency of a switch of the integrated voltage regulator. Adjusting the operating parameter of the integrated voltage regulator may include adjusting the stimulus applied to the inductor. The target output value may include a target output voltage of the integrated voltage regulator. The target output value may include a target output current of the integrated voltage regulator. Applying the stimulus to the inductor to change the inductance of the inductor may include moving a position of an electrode on a coil around the inductor. The method/operations may further include storing a data structure comprising a plurality of stimuli to be applied to the inductor to change the inductance of the inductor to a corresponding plurality of inductances. The method/operations may further include providing the target output value to the data structure and receiving the stimulus to be applied to the inductor in response. The data structure may include a set of inductances at the target output value, where the set of inductances may generate the target output value at corresponding different operating frequencies for a switch of the integrated voltage regulator. The control circuit may causes the integrated voltage regulator to operate at a frequency between approximately 100 MHz and approximately 200 MHz. The control circuit and the integrated voltage regulator may be part of an integrated circuit system implemented in a silicon substrate.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5D illustrate graphs that illustrate the relationship between the voltage applied to the piezoelectric material and the resulting inductance value, according to some embodiments.

DETAILED DESCRIPTION

Some modern IVR applications may use a switching frequency in the range of approximately 100 MHz to 200 MHz. This switching frequency corresponds to inductance values in the inductor of a switching regulator to be in the nH range rather than the conventional pH range. When the regulator is an integrated part of a circuit, this inductor needs to be designed at the substrate level for peak accuracy and high efficiency. For example, the IVR may be part of an integrated circuit system that is implemented on a silicon substrate, and the IVR, with a corresponding memory and control circuit, may be part of a standard cell or component in a design library. At these frequencies, the inductor may need to be tuned in such a way that high inductance densities with a high quality factor are maintained. However, conventional IVRs used fixed-value inductors, which limit the operational frequency and loop bandwidth ranges of the IVR.

The embodiments described herein solve these and other technical problems by using a tunable inductor that can be dynamically programmed in an integrated circuit. For example, the inductance value of the inductor may be tuned with respect to a specified output voltage ($V_{out}$), a specified output current ($I_{out}$), and/or a system switching frequency. Precalculated inductance values for any of these three variables can be saved and maintained in a memory device, such as a lookup table, with the IVR design block. This design block can be accessed through inter-IC communication bus protocols, such as the Improved Inter-Integrated Circuit ($I^3C$) protocol. Additionally, the lookup table may populate coefficients that are mapped to the tuned settings of inductance and/or capacitance values based on a feedback mechanism, magnetic core loss, saturation current, system efficiency, system power consumption, special harmonic components, and/or other characteristics. This information may be collected or characterized prior to operation, then applied in real time based on specified operating conditions or applications.

Figure 1:
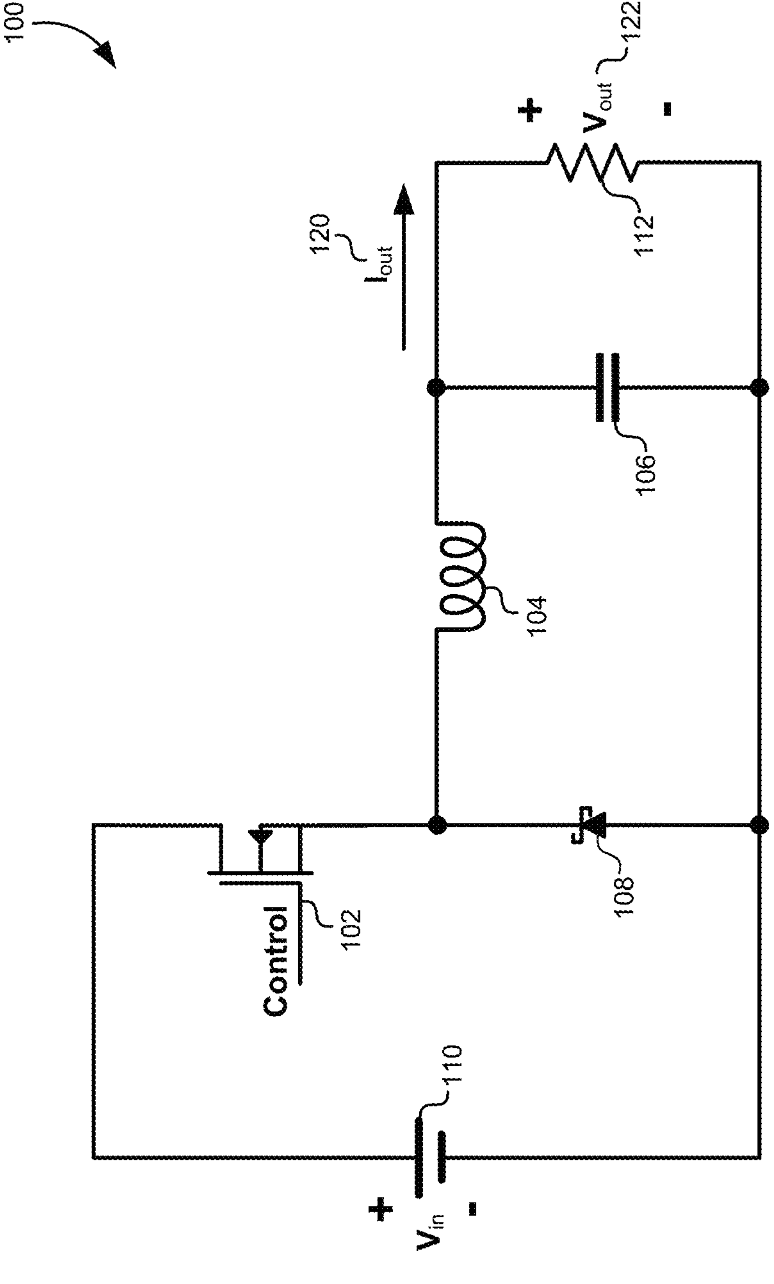
FIG. 1 illustrates an IVR with a tunable inductor, according to some embodiments.

FIG. 1 illustrates an IVR 100 with a tunable inductor 104, according to some embodiments. By way of example, the IVR 100 may be implemented using a traditional buck converter design as illustrated in FIG. 1. The IVR 100 may include a switch 102, a diode 108, an output capacitor 106, and an inductor 104. An input voltage 110 may provide input power to the IVR 100. When the switch 102 turns on, the switch 102 allows current to flow to the output capacitor 106 and through a load 112. During the switching cycle when the switch 102 remains closed, the current will initially rise through the inductor 104, as the capacitor 106 initially acts as a short-circuit as the capacitor 106 is charged.

When the switch 102 is turned off, the input voltage 110 is removed from the inductor 104. However, because the current in the inductor 104 cannot change instantaneously, the voltage across the inductor 104 will adjust to hold the current constant. For example, the input end of the inductor 104 may be driven to a negative voltage by the decreasing current, eventually reaching the point where the diode 108 turns on. The inductor current then flows through the load 112 and back through the diode 108. Additionally, the capacitor 106 may discharge into the load 112 during the cycle when the switch 102 is open, thus contributing to the total current being supplied to the load 112. The total current through the load 112 when the switch 102 is open may be an aggregate of the inductor and capacitor currents.

The output current 120 and the output voltage 122 may be a function of the value of the capacitor 106, the value of the inductor 104, the input voltage 110, and the switching frequency of the switch 102, among other circuit parameters. However, the most consequential of these parameter values is often the value of the inductor 104. This is particularly true in the applications where the IVR switching frequency will be in the range of approximately 100 MHz to approximately 200 MHz. Precise tuning of the nH-range inductor 104 is necessary to provide an accurate and consistent output current 120 and/or output voltage 122. Furthermore, some applications may benefit from the ability to tune or adjust the value of the inductor 104 for different applications. For example, the embodiments described herein use a tunable inductor 104, for which the inductance value can be set prior to and during operation to produce a different output current 120 and/or a different output voltage 122, or to be compatible with different switching frequencies and/or a different input voltage 110. For example, the tunable inductors described herein may have inductance value that can be adjusted from between approximately 1 nH to approximately 15 nH for different use cases of the IVR.

Figure 2:
FIG. 2 illustrates a configuration for a tunable inductor, according to some embodiments.
Figure 2:
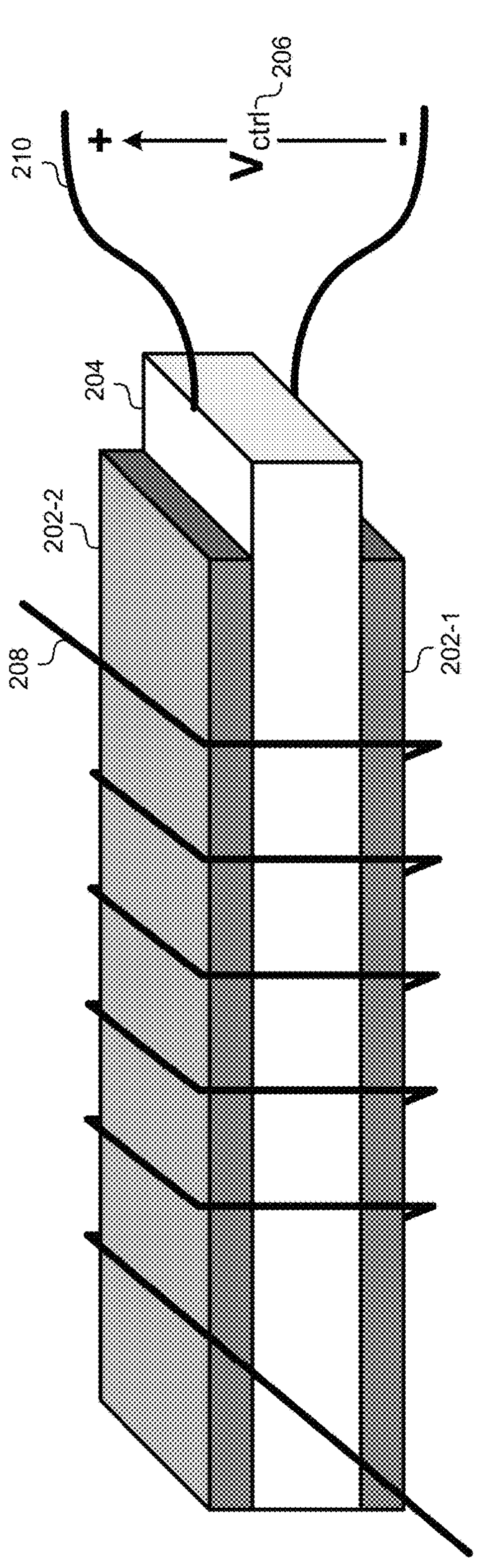

FIG. 2 illustrates a configuration for a tunable inductor 200, according to some embodiments. The tunable inductor may be tuned using a thin film magnetic inductance at the substrate level and adjusted using a piezoelectric material. For example, an inverse or reverse piezoelectric effect may be used to apply electrical energy to a piezoelectric material to cause the crystal to strain, vibrate, or expand. This conversion of electrical energy into mechanical energy in the piezoelectric material may be leveraged to adjust the inductance of the tunable inductor 200 as described in detail below.

For example, the tunable inductor 200 may include an inductor core that comprises a piezoelectric layer 204 having a relatively high piezoelectric coefficient. For example, some embodiments may use a piezoelectric charge/displacement coefficient $d_{31}$ value in the range of approximately −190 pC/N to approximately −640 pC/N. Embodiments may use any type of piezoelectric material, such as variations of Lead Zirconate Titanate (PZT). For example, embodiments may use material such as PZT-5H, PZT-5A, PZT-5J, PMN-PT, and other similar materials. The piezoelectric layer 204 may be formed between a bottom or "first" magnetic layer 202-1 and a top or "second" magnetic layer 202-2. The magnetic layers 202 and the piezoelectric layer 204 may be coupled with electrically conductive and/or dielectric layers for contact and/or isolation as required by the particular application. A conductive coil 208 may be wrapped around the magnetic layers 202 and the piezoelectric layer 204 to form the solenoid-type magnetoelectric inductor as the tunable inductor 200. The conductive coil 208 may have a length l and a number of turns N. A voltage 206 may be applied to the piezoelectric layer 204 in order to generate the reverse piezoelectric effect in the piezoelectric layer 204. The voltage 206 may be applied by a pair of electrical leads 210 that are coupled to opposite layers or edges of the piezoelectric layer 204.

Figure 3:
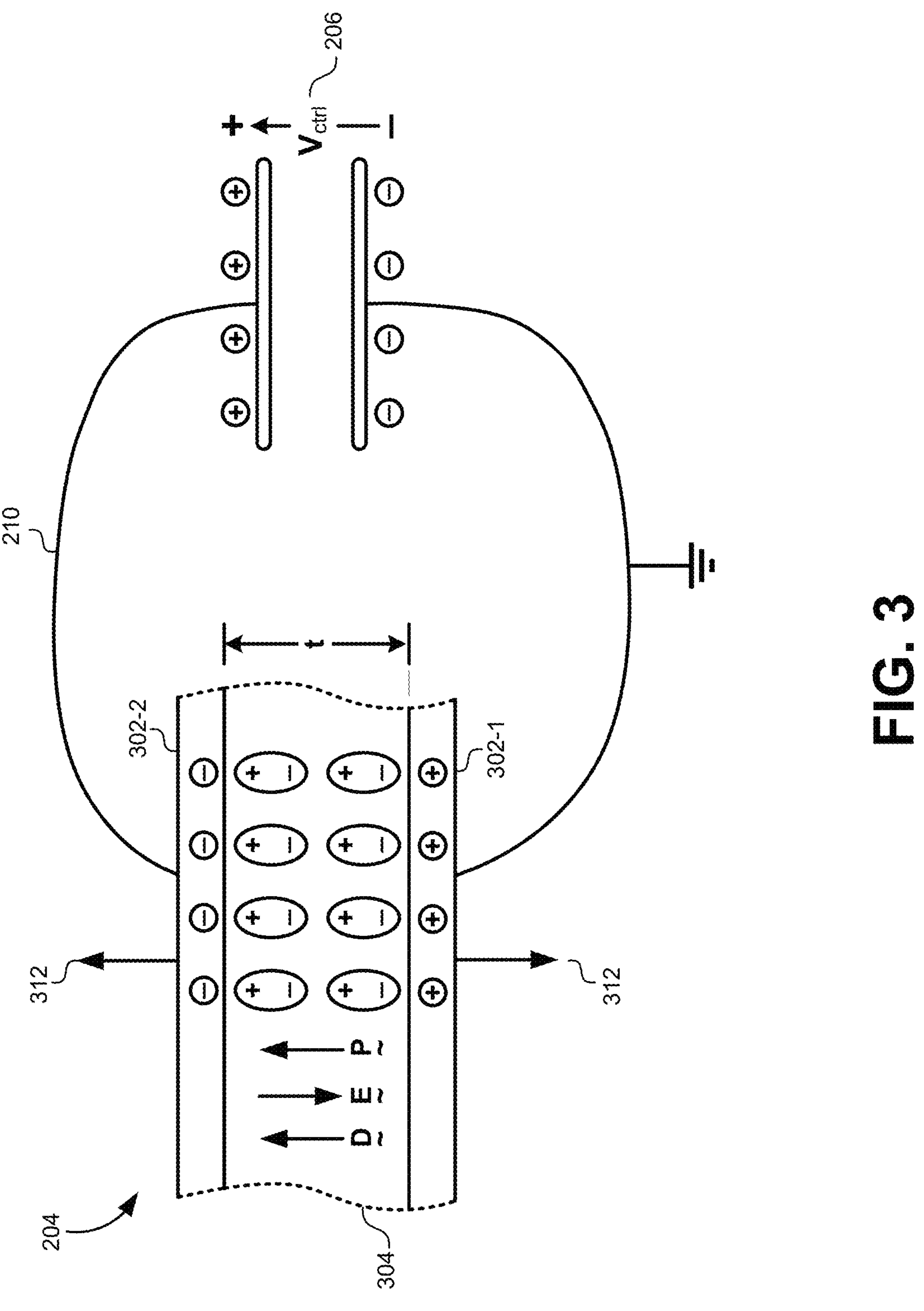
FIG. 3 illustrates a diagram of a piezoelectric layer with an applied voltage, according to some embodiments.

FIG. 3 illustrates a diagram of a piezoelectric layer 204 with an applied voltage 206, according to some embodiments. The piezoelectric layer 204 may include a piezoelectric material 304. The piezoelectric material 304 may be placed between a bottom or "first" electrode 302-1 and a top or "second" electrode 302-2. These electrodes 302 may be coupled to the pair of electrical leads 210, which are in turn coupled to the piezoelectric voltage 206. The piezoelectric voltage 206 may be an adjustable voltage that is used to set the value of the tunable inductor 200 using a system as described in detail below.

When the piezoelectric voltage 206 is applied across the electrodes 302, this piezoelectric voltage 206 and may excite the piezoelectric material 304 to induce stress or displacement in the piezoelectric material 304. This stress or displacement may also affect the magnetic layers 202 illustrated above in FIG. 2. Specifically, the voltage 206 may induce an electric field in the piezoelectric material 304. This field may affect the magnetic anisotropy of the magnetic layers 202. The induced magnetic anisotropy may then lead to a change in the relative permeability of the magnetic layers 202. Specifically, as illustrated in FIG. 3, the induced electric field may cause polarization within the piezoelectric material 304, and may exert a force 312 on the magnetic layers 202.

This change in the magnetic layers 202 may ultimately affect the inductance value of the tunable inductor 200. The piezoelectric displacement constant and the induced electrical field strength may depend on the value of the voltage 206. The displacement D will generally be in an opposite direction of the induced electric field. The electric field strength E may depend on the voltage 206 and the thickness of the piezoelectric material 304 (E=−V/t). Therefore, by varying the voltage 206, the value of the electric field E can be changed to generate a significant difference in the inductance value of the tunable inductor 200. It should be noted that the energy associated with this process for adjusting the inductance will generally be very small (e.g., in the mJ range) when compared to the energy used to run the IVR.

Figure 4:
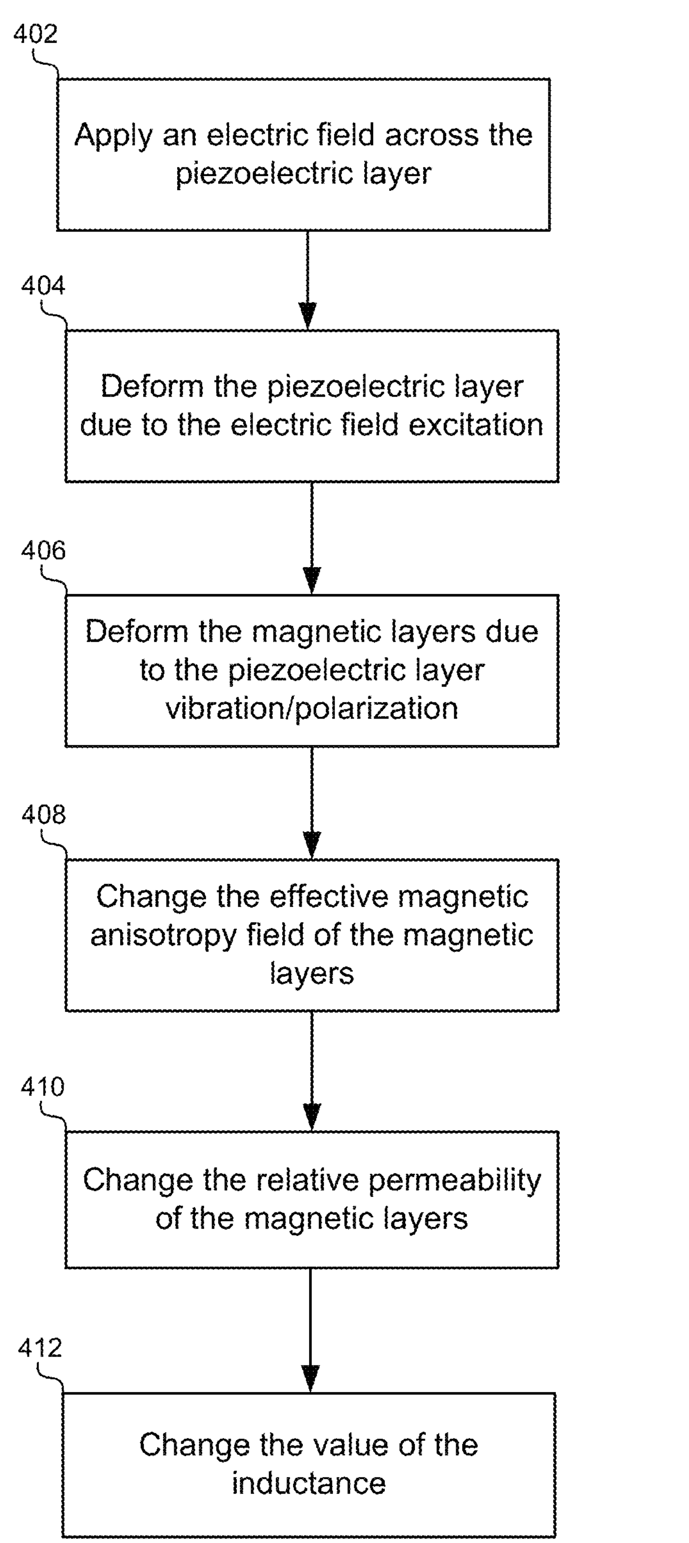
FIG. 4 illustrates a flowchart of a method for adjusting the value of a tunable inductor by applying a voltage, according to some embodiments.

FIG. 4 illustrates a flowchart 400 of a method for adjusting the value of a tunable inductor by applying a voltage, according to some embodiments. The method may include applying an electric field across a piezoelectric layer (402). This electric field may be generated by applying a voltage to opposing electrodes or sides of a piezoelectric material. As a result of applying the electric field, the piezoelectric layer may be deformed (402), which may cause a similar deformation in the magnetic layers (406) in the form of vibration and/or polarization. The deformation in the magnetic layers may change the effective magnetic anisotropy field of the magnetic layers (408). The change in the effective magnetic anisotropy field may then cause a change in the relative permeability of the magnetic layers (410), and the relative permeability may directly change the value of the inductance of the tunable inductor (412).

In order to show how the steps in the flowchart 400 are performed by the tunable inductor, the following equations illustrate mathematically how the applied electric field will result in the operations described above that change the value of the inductance. First, the effective magnetic anisotropy $H_{eff}$ may be expressed as a sum of the intrinsic anisotropy $H_a$ and the induced anisotropy field due to the magneto electric coupling of the electric field $H_{ME}$.

$$H_{eff}=H_a+H_{ME} \tag{1}$$

The induced anisotropy field due to the magneto electric coupling of the electric field $H_{ME}$ may be expressed as $$H_{ME}=3/2\lambda_s Y d_{31} E \tag{2}$$

In equation (2), E may represent the electric field strength, Y may represent Young's modulus of the magnetic layer, $\lambda_s$ may represent the saturation magnetostriction of the magnetic layer, and $d_{31}$ may represent the piezoelectric coefficient of charge/displacement of the piezoelectric material. As shown in equation (2), the strength of the electric field E changes the induced anisotropy field and the effective magnetic anisotropy $H_{eff}$ in equation (1) through the deformation of the piezoelectric layer and the subsequent deformation of the magnetic layers. The change in anisotropy may then cause a change in the relative permeability $\mu_{eff}$ of the magnetic layers.

$$\mu_{reff} = 1 + \frac{(\mu_0 M_s^2)}{2H_{eff}} \tag{3}$$

In equation (3), $M_s$ may represent the saturation magnetization of the magnetic layers, and $\mu_0$ may represent the vacuum permeability. Combining equations (1), (2), and (3) yields the following equation.

$$\mu_{reff} = 1 + \frac{(\mu_0 M_s^2)}{2H_a + 3\lambda_s Y d_{31} E} \tag{4}$$

The inductance L of the tunable inductor may then be expressed by the following equation for a solenoid inductor.

$$L = \frac{\mu_0 \mu_{reff} N^2 A}{l} \tag{5}$$

Where N is the number of turns in the inductor, l is the length of the wire, and A is the cross-sectional area of the inductor. The changing inductance can then be expressed in terms of the tunability factor γ.

$$\gamma = \frac{L_0 - L_e}{L_e} \tag{6}$$

In equation (6), $L_e$ may represent the effective inductance value after the electric field is applied across the piezoelectric material, and $L_0$ may represent the nominal inductance in the absence of the electric field. The final effective inductance $L_e$ may then be expressed as $$L_e = \frac{L_0}{1+\gamma} \tag{7}$$

Therefore, the inductance of the tunable inductor can be adjusted by adjusting the value of the applied voltage across the piezoelectric layer. Consequently, the changing inductance can be used to tune the desired output voltage and/or output current of the IVR. FIGS. 5A-5D illustrate graphs that illustrate the relationship between the voltage applied to the piezoelectric material and the resulting inductance value, according to some embodiments. Each of these graphs illustrate values of inductance for a given input voltage and a desired or target output current. The individual curves in the graphs illustrate results for different switching frequencies of the IVR. These graphs may be obtained experimentally or mathematically for an individual tunable inductor, and the resulting voltage and inductance values may be stored in a memory, such as a lookup table, for use in on-chip applications.

The values in these graphs may be used to populate a memory or lookup table. For example, using equations (1)-(7) above, values for the effective inductance may be calculated and stored based on an applied voltage across the piezoelectric material. A limited example of such values is listed below in Table 1. It should be understood that the voltages and inductances in Table 1 are provided only by way of example for a particular configuration. These values may be calculated for each individual inductor based on their manufactured and/or intrinsic properties. Furthermore, the voltages and inductances listed in Table 1 are only representative of a limited range of such possible values. In practice, the table of values stored in the memory or lookup table may include many additional voltages, voltage ranges, and/or voltage increments.

TABLE 1

PZT Voltage vs. Inductance Values

| PZT Voltage (V) | Electric Field (V/m) | Effective Inductance (nH) |
|---|---|---|
| 1 | 6.67e+05 | 9.16 |
| 1.5 | 1.00e+06 | 8.79 |
| 2 | 1.33e+06 | 8.45 |
| 2.5 | 1.67e+06 | 8.13 |
| 3 | 2.00e+06 | 7.84 |
| 3.5 | 2.33e+06 | 7.57 |
| 4 | 2.67e+06 | 7.31 |
| 4.5 | 3.00e+06 | 7.07 |
| 5 | 3.33e+06 | 6.85 |
| 5.5 | 3.67e+06 | 6.64 |
| 6 | 4.00e+06 | 6.45 |
| 6.5 | 4.33e+06 | 6.26 |
| 7 | 4.67e+06 | 6.09 |
| 7.5 | 5.00e+06 | 5.92 |
| 8 | 5.33e+06 | 5.76 |

In conjunction with Table 1, additional table values may be stored in the memory and used to look up a particular voltage to be applied. For example, inductance values at different switching frequencies may be calculated relative to desired input voltages, output voltages, and/or output currents. These values may be stored in additional columns of Table 1 or in an additional table, such as Table 2 listed below. A circuit designer and/or a control circuit may use operating circuit characteristics, such as an available input voltage, a switching frequency, a target output voltage, and/or a target output current in order to select a target inductance using values from Table 2. The target inductance may then be used to look up a piezoelectric voltage to be applied to the piezoelectric layer using Table 1. In this example, Table 1 illustrates a set of inductances for each output value (e.g., each target output voltage). The set of inductances may correspond to different operating frequencies for the switch of the IVR.

TABLE 2

Inductance Values vs. Input

| $I_{out}$ (A) | $V_{in}$ (V) | $V_{out}$ (V) | L @ 100 MHz (nH) | L @ 100 MHZ (nH) | L @ 100 MHZ (nH) | L @ 100 MHZ (nH) |
|---|---|---|---|---|---|---|
| 1 | 2 | 0.25 | 8.575 | 5.72 | 4.76 | 4.28 |
| 1 | 2 | 0.6 | 16.47 | 10.99 | 9.15 | 8.28 |
| 1 | 2 | 0.8 | 18.83 | 12.56 | 10.46 | 9.41 |
| 1 | 2 | 1.4 | 16.50 | 11.01 | 9.17 | 8.25 |
| 2 | 2 | 0.25 | 4.29 | 2.86 | 2.83 | 2.14 |
| 2 | 2 | 0.6 | 8.23 | 5.50 | 4.58 | 4.12 |
| 2 | 2 | 0.8 | 3.42 | 6.28 | 5.23 | 4.71 |
| 2 | 2 | 1.4 | 8.25 | 5.50 | 4.59 | 4.13 |
| 3 | 2 | 0.25 | 2.85 | 1.31 | 1.59 | 1.43 |
| 3 | 2 | 0.6 | 5.49 | 3.66 | 3.05 | 2.75 |
| 3 | 2 | 0.8 | 6.27 | 4.18 | 3.49 | 3.14 |
| 3 | 2 | 1.4 | 5.50 | 3.67 | 3.06 | 2.75 |

As with Table 1, Table 2 provides only representative values by way of example and is not meant to be limiting. These values have been calculated for a particular IVR implementation, and individual values may be experimentally or mathematically derived using the chosen circuit characteristics for any other IVR implementation. Furthermore, the voltage, current, frequency, and/or inductance ranges illustrated in Table 2 represent only a small subset of the available ranges and increments that may be available for these values.

Figure 6:
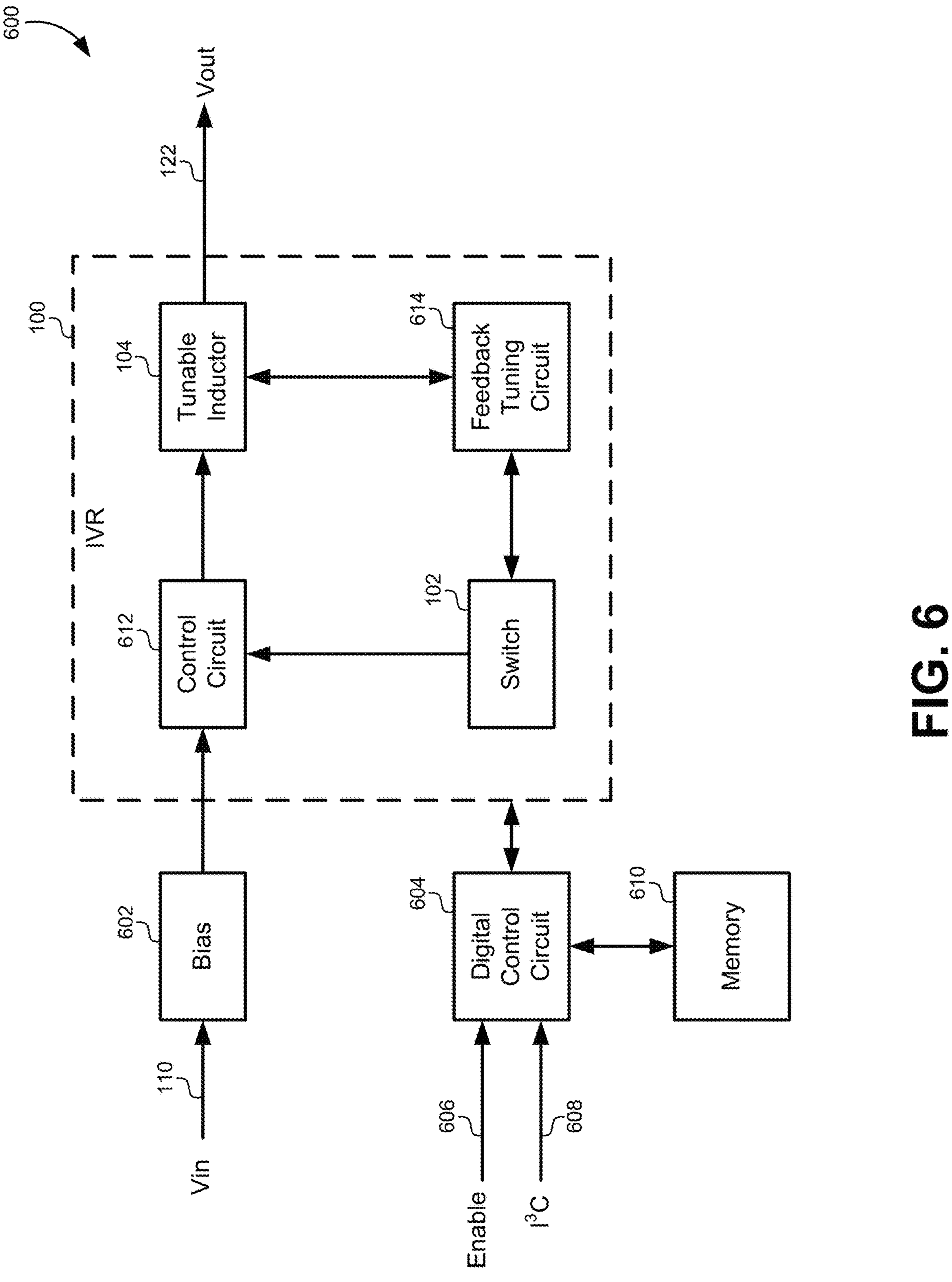
FIG. 6 illustrates a block diagram of a system for tuning the output characteristics of an IVR, according to some embodiments.

FIG. 6 illustrates a block diagram of a system 600 for tuning the output characteristics of an IVR 100, according to some embodiments. The system 600 may be part of a logic block that is implemented on an on-chip system. The system 600 may include a tunable IVR 100 as described above. The tunable IVR 100 may include a tunable inductor 104, a switch 102, and other circuit components as also described above. The IVR 100 may provide an output voltage 122 and a corresponding output current. An input voltage 110 may also be provided to the IVR 100. In some embodiments, the input voltage 110 may be provided through a bias circuit 602 that may be part of the logic block.

The IVR 100 may be coupled to a control circuit 604. The control circuit 604 may be implemented using a microcontroller or discrete digital components configured to perform the specified operations. The control circuit 604 may be coupled to a communication bus 608 that receives commands and/or information for operating the IVR 100. For example, an $I^3C$ communication bus 608 may be used to transmit a target value for the output voltage 122 or current, along with other operating characteristics (e.g., switching frequency, input voltage, output currents, etc.). The control circuit 604 may be configured to receive an enable command 606 to enable the IVR 100.

The control circuit 604 may also be configured to perform operations to control and/or tune the IVR 100. For example, the control circuit 604 may be configured to receive a target operating characteristic of the IVR 100. The control circuit 604 may be coupled to a memory 610 or may use an integrated memory. The memory 610 may include data structures that may be used to look up and/or calculate a target value, such as a target inductance and/or target voltage to be applied to the piezoelectric layer of the tunable inductor. More generally, the data structure may store a plurality of stimuli to be applied to the inductor in order to change the inductance of the inductor to a corresponding plurality of inductances, or to generate a corresponding plurality of output values from the IVR. For example, a target output voltage and/or output current may be provided through the communication bus 608 to the control circuit 604. The control circuit 604 may also receive or store a switching frequency and input voltage 110 for the IVR 100. The control circuit 604 may use the target output voltage and/or output current to retrieve a target inductance and/or target piezoelectric voltage from the memory 610. The control circuit 604 may then be configured to provide the piezoelectric voltage to the IVR 100.

The IVR 100 may include a control circuit 612, which in some embodiments may also be integrated with the control circuit 604. The control circuit 612 may apply the piezoelectric voltage to the piezoelectric layer of the tunable inductor 104. This may set the inductance value of the tunable inductor 104 that will cause the IVR 100 to generate the target output voltage 122 and/or output current for the given input voltage 110 and/or operating frequency. The control circuit 612 may update or change the piezoelectric voltage applied to the tunable inductor 104 before operation or at any point during operation. Thus, the tunable inductor 104 may be dynamically adjusted during operation to change the output characteristics of the IVR 100 based on the needs of a particular application.

In some embodiments, the IVR 100 may include a feedback tuning circuit 614. The feedback tuning circuit 614 may be implemented using a microcontroller or discrete digital circuit components. For example, the feedback tuning circuit 614 may include a comparator that compares the output voltage 122, the current through the tunable inductor 104, and/or other electrical characteristics of the IVR 100 to target values. The comparator may generate an error value that is used to adjust the switching frequency of the switch 102. For example, the target piezoelectric voltage retrieved from the memory 610 may need to be varied during operation as the environmental characteristics of the system 600 change. For example, changing temperatures they be compensated by also changing the piezoelectric voltage applied to the tunable inductor 104. If the temperature changes and the output voltage 122 changes in response, the feedback tuning circuit 614 may compensate by adjusting the switching frequency of the switch 102 of the IVR 100 in order to adjust the output voltage 122 back to the target value.

For example, the feedback tuning circuit 614 may monitor the output value of the integrated voltage regulator during operation, such as monitoring an output voltage or output current. The feedback tuning circuit 614 may also be configured to determine that the target inductance is not producing the target output value. Alternatively or additionally, the feedback tuning circuit 614 may determine that the stimulus applied to the inductor is not generated the target inductance. In either case, the measured output value may not be within a threshold range of the target output value. In response, the feedback tuning circuit 614 may adjust an operating parameter of the IVR to move the output value of the integrated voltage regulator closer to the target output value. For example, the feedback tuning circuit 614 may be configured to adjust the operating frequency of the switch 102 as described above. Additionally or alternatively, the feedback tuning circuit 614 may also cause the control circuit 612 to raise or lower the piezoelectric voltage applied to the tunable inductor 104.

Figure 7:
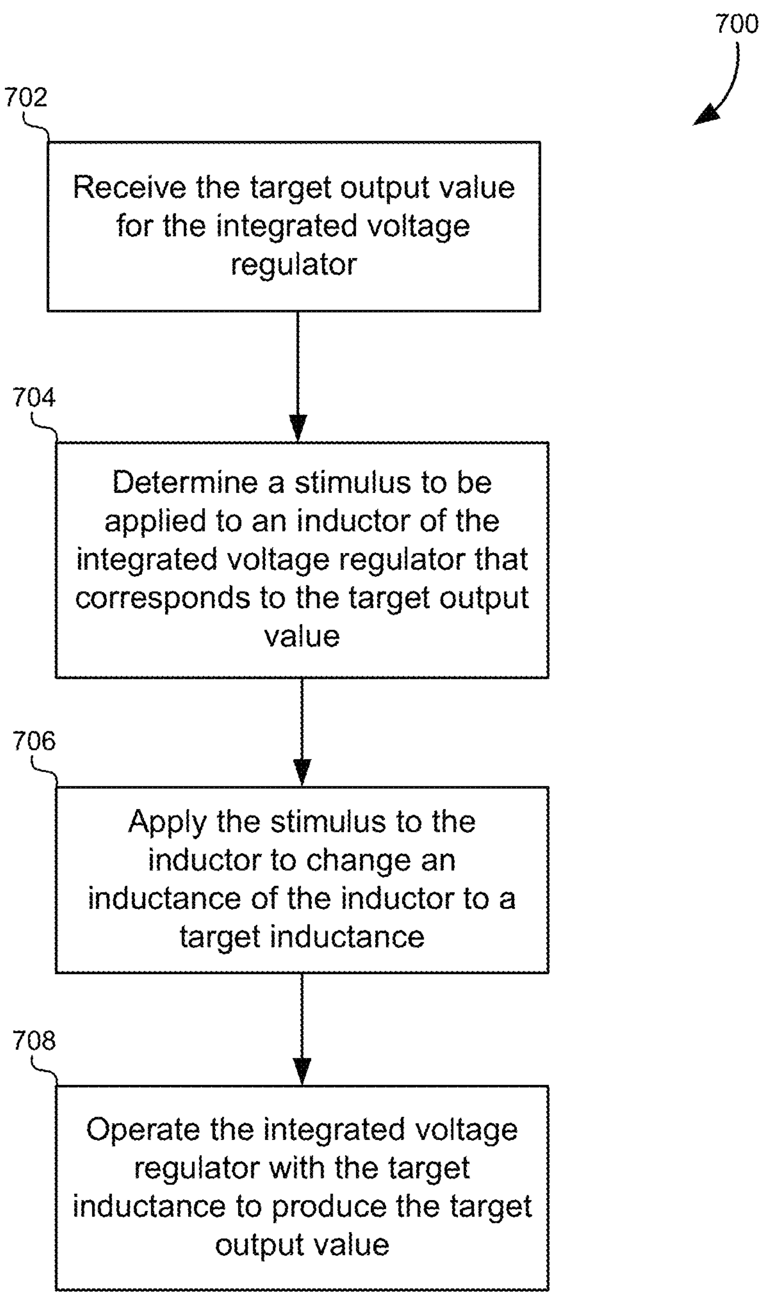
FIG. 7 illustrates a method of tuning an integrated voltage regulator to produce a target output voltage, according to some embodiments.

FIG. 7 illustrates a method of tuning an integrated voltage regulator to produce a target output voltage, according to some embodiments. Some of the steps of this method may be executed by a control circuit, which may include a microprocessor. For example, a microprocessor may include one or more processors and one or more memory devices storing instructions that, when executed by the one or more processors, cause the one or more processors to perform operations comprising at least some of the steps of this method. The method may include receiving the target output value for the integrated voltage regulator (702). For example, the target output value may be received from a communication bus by a control circuit for the IVR. The target output value may include a target output voltage and/or a target output current for the IVR. The target output value may be received by a control circuit as described above.

The method may also include determining a stimulus to be applied to an inductor of the IVR (704). The stimulus may correspond to the target output value. For example, the stimulus may include any type of electrical stimulus, such as a voltage or electric field to be applied to a piezoelectric layer of a tunable inductor as described above. Other embodiments may use other methods or types of tunable inductors that use other methods, such as altering other physical characteristics of the inductor. For example, the tunable inductor may include moving a position of the electrode on the coil around the inductor. The stimulus may be determined by using a lookup table of predetermined values for the stimulus that correspond to different target output values for the IVR. For example, a lookup table may include voltages to be applied to the inductor in order to generate a target inductance value, a target output voltage, and/or a target output current for the IVR.

The method may further include applying the stimulus to the inductor to change the inductance of the inductor to a target inductance (706). The stimulus may change the inductance of the inductor by generating an electric field across a piezoelectric layer in the inductor as described above. This may cause the inductance of the inductor to increase/decrease in response to the applied voltage. The method may then operate the integrated voltage regulator with the target inductance to produce the target output value (708).

It should be appreciated that the specific steps illustrated in FIG. 7 provide particular methods of tuning an integrated voltage regulator according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
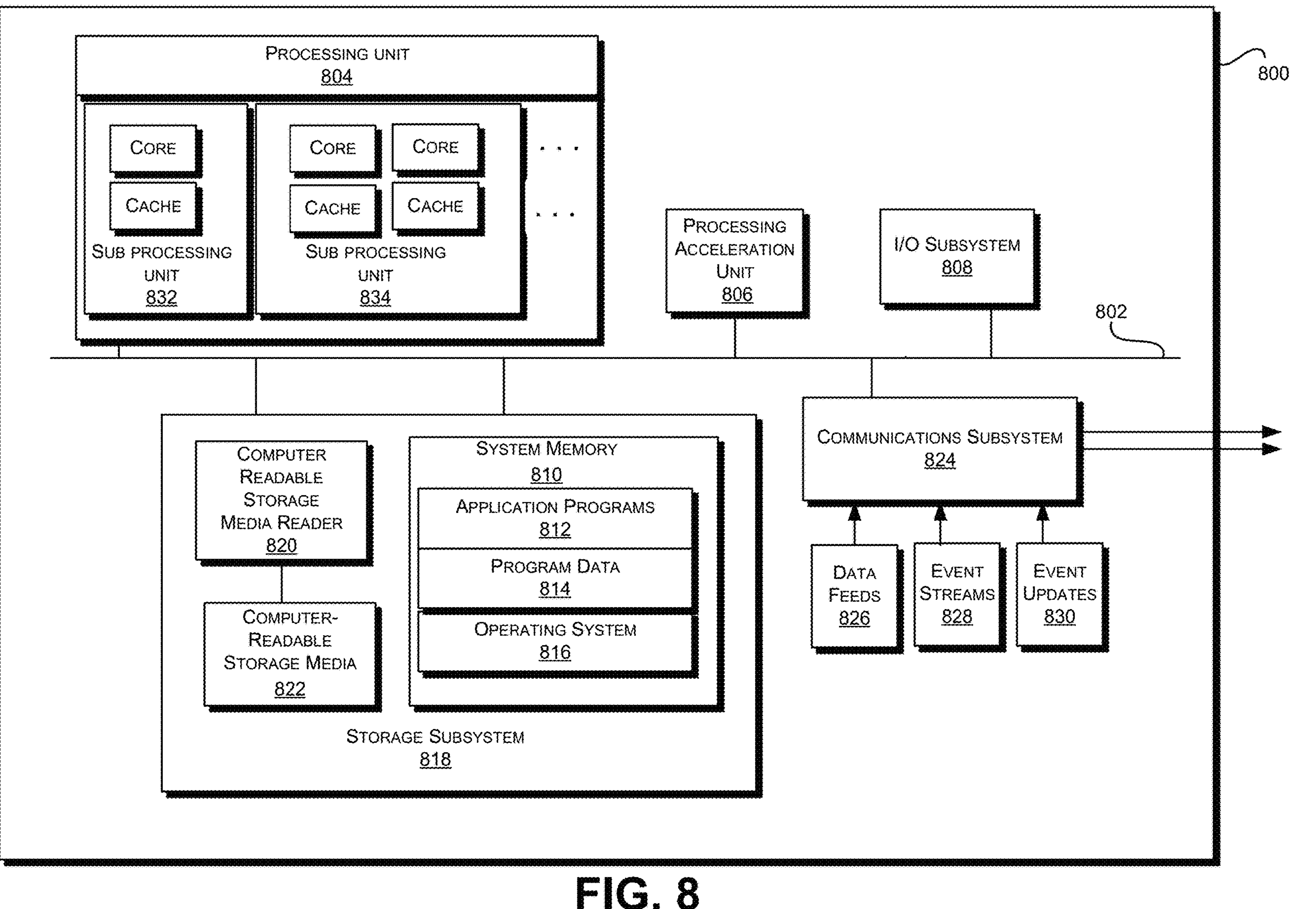
FIG. 8 illustrates an exemplary computer system, in which various embodiments may be implemented.

FIG. 8 illustrates an exemplary computer system 800, in which various embodiments may be implemented. For example the system 800 may be used to implement a computer system that communicates with the IVR through the communication bus as described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term “output device” is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with some embodiments.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments.

However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of tuning an integrated voltage regulator to produce a target output value, the method comprising:

receiving the target output value for the integrated voltage regulator;

determining a stimulus to be applied to an inductor of the integrated voltage regulator that corresponds to the target output value;

applying the stimulus to the inductor to change an inductance of the inductor to a target inductance; and operating the integrated voltage regulator with the target inductance to produce the target output value.

2. The method of claim 1, wherein the integrated voltage regulator comprises:

the inductor; and a switch coupled to the inductor; and a control circuit configured to tune the inductance of the inductor to generate the target output value of the integrated voltage regulator.

3. The method of claim 2, wherein the integrated voltage regulator further comprises a buck regulator with a capacitor in series with the inductor.

4. The method of claim 2, wherein:

the inductor comprises a piezoelectric material with a first side and a second side; and the stimulus to change the inductance of the inductor by applies a voltage between the first side and the second side of the piezoelectric material.

5. The method of claim 4, wherein the piezoelectric material comprises a piezoelectric coefficient between approximately −190 pC/N and approximately −640 pC/N.

6. The method of claim 4, wherein the piezoelectric material is positioned between a first magnetic layer and a second magnetic layer.

7. The method of claim 4, further comprising wherein the integrated voltage regulator further comprises:

a conductive coil wrapped around the piezoelectric material to form a solenoid-type inductor; and a pair of electrical leads coupled to opposite edges of the piezoelectric material and coupled to the control circuit, wherein the pair of electrical leads are different from the conductive coil.

8. The method of claim 1, wherein tuning the inductance value of the inductor comprises:

deforming a piezoelectric layer of the inductor;

deforming one or more magnetic layers caused by deforming the piezoelectric layer;

changing an effective magnetic anisotropy field of the one or more magnetic layers by deforming the one or more magnetic layers;

changing a relative permeability of the one or more magnetic layers by changing the effective magnetic anisotropy field of the one or more magnetic layers; and changing the inductance value of the inductor by changing the relative permeability of the one or more magnetic layers.

9. The method of claim 1, further comprising:

monitoring an output value of the integrated voltage regulator during operation;

determining that the output value of the integrated voltage regulator is not within a threshold range of the target output value; and adjusting an operating parameter of the integrated voltage regulator to move the output value of the integrated voltage regulator closer to the target output value.

10. The method of claim 9, wherein adjusting the operating parameter of the integrated voltage regulator comprises adjusting a switching frequency of a switch of the integrated voltage regulator.

11. The method of claim 9, wherein adjusting the operating parameter of the integrated voltage regulator comprises adjusting the stimulus applied to the inductor.

12. The method of claim 1, wherein the target output value comprises a target output voltage of the integrated voltage regulator.

13. The method of claim 1, wherein the target output value comprises a target output current of the integrated voltage regulator.

14. The method of claim 1, wherein applying the stimulus to the inductor to change the inductance of the inductor comprises moving a position of an electrode on a coil around the inductor.

15. A control circuit for tuning an integrated voltage regulator to produce a target output value, the control circuit comprising:

one or more processors; and one or more memory devices comprising instructions that, when executed by the one or more processors, cause the one or more processors to perform operations comprising:

receiving the target output value for the integrated voltage regulator;

determining a stimulus to be applied to an inductor of the integrated voltage regulator that corresponds to the target output value;

causing the stimulus to be applied to the inductor to change an inductance of the inductor to a target inductance; and causing the integrated voltage regulator to be operated with the target inductance to produce the target output value.

16. The control circuit of claim 15, wherein the operations further comprise storing a data structure comprising a plurality of stimuli to be applied to the inductor to change the inductance of the inductor to a corresponding plurality of inductances.

17. The control circuit of claim 16, wherein the operations further comprise providing the target output value to the data structure and receiving the stimulus to be applied to the inductor in response.

18. The control circuit of claim 16, wherein the data structure comprises a set of inductances at the target output value, wherein the set of inductances generate the target output value at corresponding different operating frequencies for a switch of the integrated voltage regulator.

19. The control circuit of claim 15, wherein the control circuit causes the integrated voltage regulator to operate at a frequency between approximately 100 MHz and approximately 200 MHz.

20. The control circuit of claim 15, wherein the control circuit and the integrated voltage regulator are part of an integrated circuit system implemented in a silicon substrate.

* * * * *